March 26, 1940.  H. BAADE  2,194,782
DOOR OPERATOR
Filed June 19, 1937   2 Sheets-Sheet 2
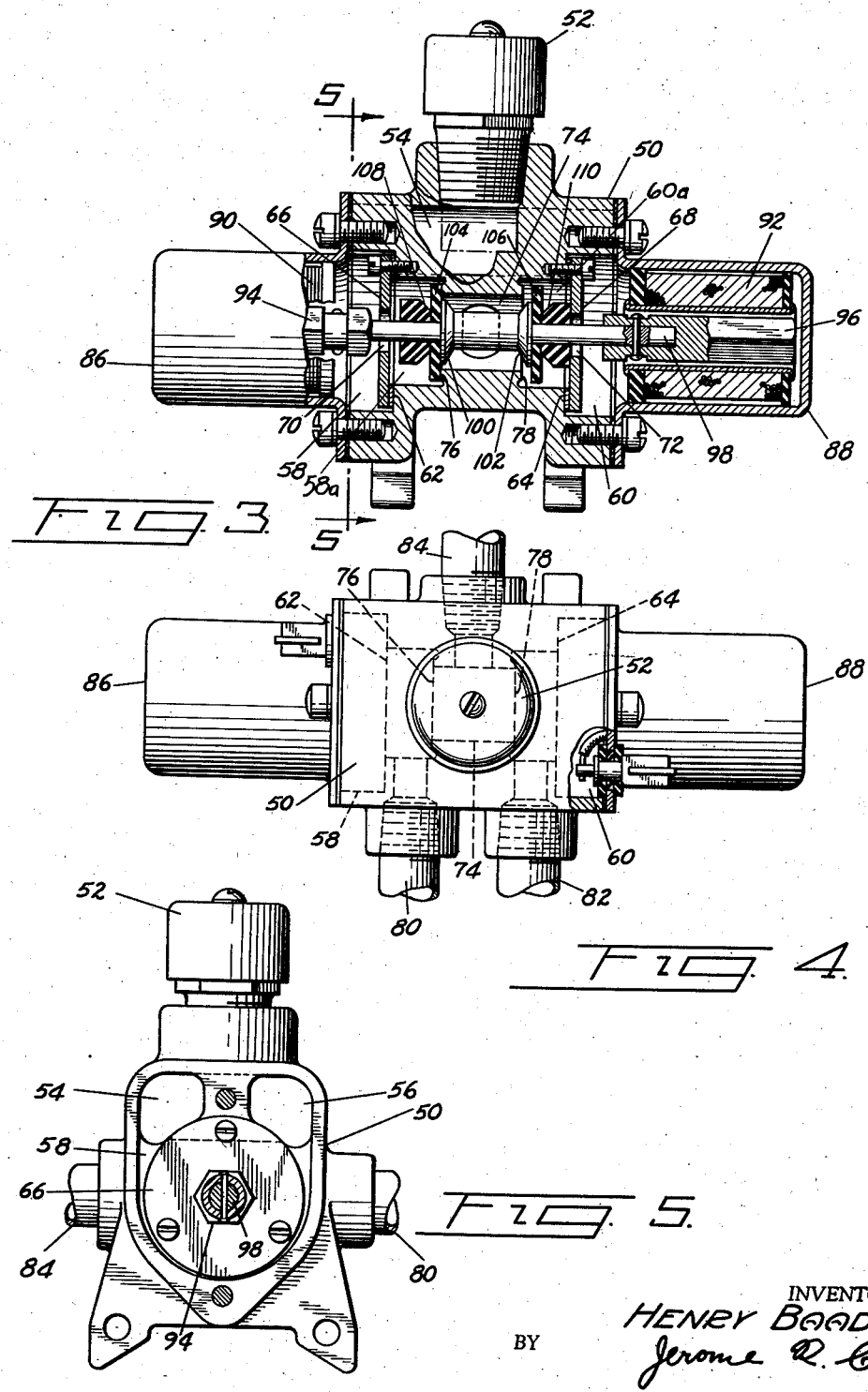
INVENTOR.
HENRY BAADE
BY Jerome R. Cox
ATTORNEY.

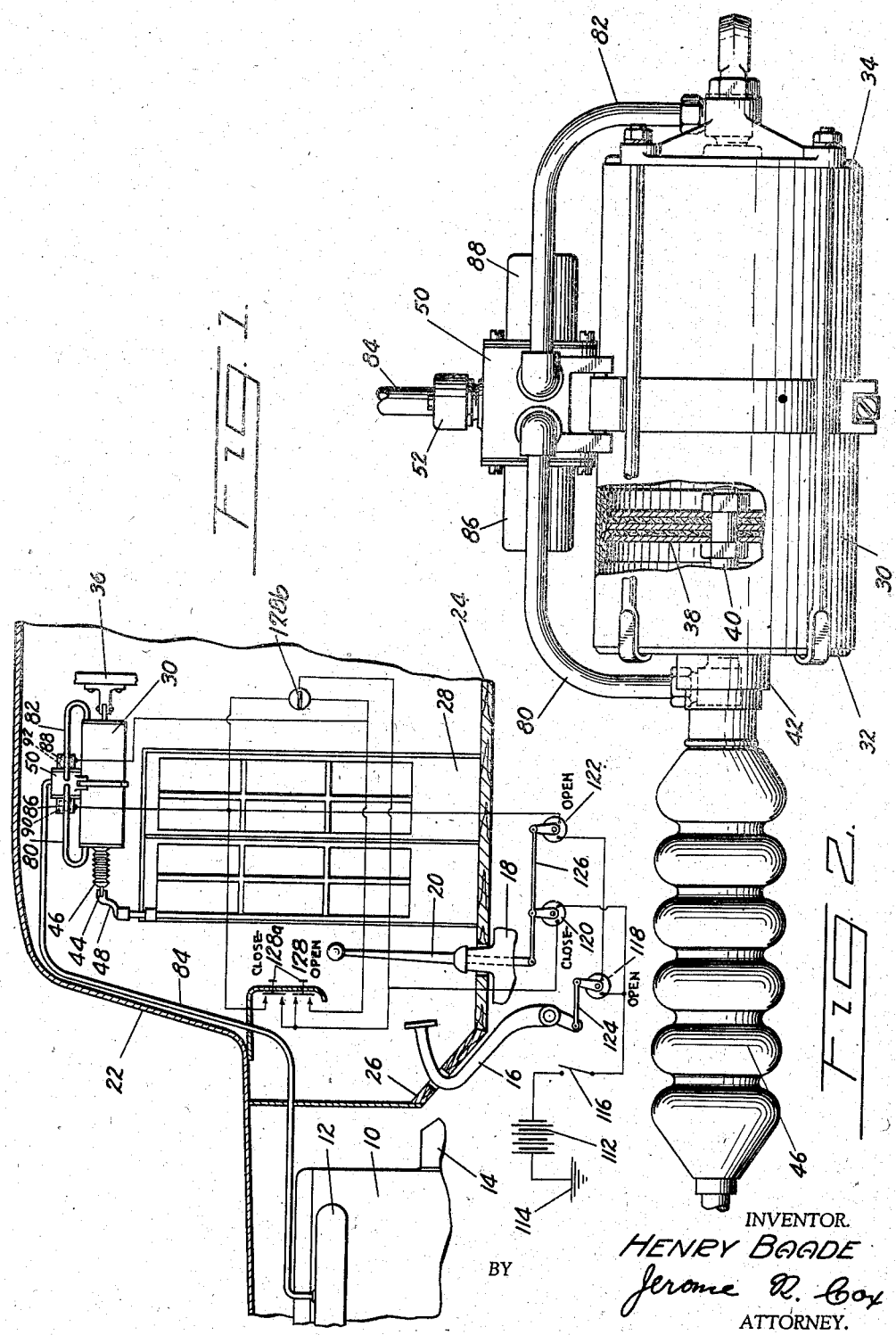

Patented Mar. 26, 1940

2,194,782

UNITED STATES PATENT OFFICE 2,194,782

DOOR OPERATOR

Henry Baade, South Bend, Ind., assignor to Bendix Products Corporation, South Bend, Ind., a corporation of Indiana Application June 19, 1937, Serial No. 149,058

2 Claims. (Cl. 180—82)

This invention relates to control devices, and more particularly to door controls.

An object of the invention is to provide automatically operative means for closing the door of a motor vehicle and maintaining the door closed during operation of the vehicle.

Another object of the invention is to provide a control for the door of a motor vehicle so interlocked with the power plant and transmission of the vehicle that upon actuation of the transmission the door is automatically closed.

Another object of the invention is to provide a control for the door of a motor vehicle so interconnected with the power plant and transmission of the vehicle that under normal operations of these instrumentalities the door is automatically closed and maintained closed, and yet may be opened and closed at the will of the operator.

Other objects and advantages of the invention will appear from the following description taken in connection with the drawings forming a part of this specification, and in which:

Figure 1 is a vertical sectional view of a motor vehicle partly broken away illustrating the invention as applied;

Figure 2 is a side elevation of the vacuum actuated device and electrically actuated control valve, the cylinder being partly broken away;

Figure 3 is a vertical section of the control valve;

Figure 4 is a top plan view of the control valve; and

Figure 5 is an end elevation of the control valve.

Referring to the drawings for more specific details of the invention, 10 represents a power plant or an internal combustion engine which may be of any type suitable for propelling a vehicle. The engine has a conventional intake manifold 12 and associated with the engine is a clutch 14 controlled as by a foot pedal lever 16. The engine also has associated therewith a transmission 18 which may be of any preferred type operated by a conventional shifting lever 20.

The vehicle has a body 22 provided with a front compartment having the usual floor board 24 and a toe board 26. The floor board has an opening for the reception of the shifting lever 20, and the toe board has an opening for the reception of the clutch pedal lever 16. The compartment also has an opening through which the operator of the vehicle and the passengers may enter and depart, and a door 28 of any suitable type for closing the opening.

The door is actuated by a vacuum device operatively connected thereto and controlled by an electrically actuated valve. As shown, a cylinder 30 having corresponding heads 32 and 34 is suitably supported on a bracket 36. The cylinder has therein a reciprocable double headed piston 38 and a rod 40 suitably secured to the piston extends through a stuffing box 42 in the head 32. The rod has on its outer end a clevis 44 pivoted to a crank 48 operatively connected to the door 28 and sleeved on the rod between the stuffing box 42 and the clevis 44 is a flexible boot 46 for the exclusion of dust and other foreign substances.

Valve mechanism including a casing 50 suitably mounted on the cylinder 30 has superimposed thereon an air cleaner 52 communicating with corresponding air passages 54 and 56 arranged longitudinally within the casing in parallel relation to one another. The housing of the casing 50 also has therein corresponding oppositely disposed chambers 58 and 60 each having a small chamber indicated respectively as 58ª and 60ª associated therewith. The large and small chambers form at their junctions a pair of oppositely disposed shoulders 62 and 64 which co-act with valve seats 66 and 68. The valve seats 66 and 68 are disk-like elements which are formed with concentric orifices 70 and 72 affording communication between the large chambers 58 and 60 and the small chambers 58ª and 60ª. The chambers 58 and 60 intercept air passages 54 and 56 so as to vent the chambers to the atmosphere and arranged intermediate the chambers 58ª and 60ª is a chamber 74 of yet smaller diameter providing a communication between the chambers 58ª and 60ª and forming at its junctions with the chambers 58ª and 60ª oppositely disposed annular shoulders 76 and 78. The chamber 58ª is connected by a suitable conduit 80 to one end of the cylinder 30; the chamber 60ª is connected by a suitable conduit 82 to the other end of the cylinder 30; and the intermediate chamber 74 is connected by a suitable conduit 84 to the intake manifold 12 of the power plant or engine 10.

Oppositely disposed solenoid housings 86 and 88 suitably secured to the respective ends of the valve casing 50 and opening into the valve casing have suitably supported therein corresponding solenoids 90 and 92. The cores 94 and 96 of the solenoids are connected as by a rod 98 having centrally of its length a portion of increased diameter provided with oppositely disposed flanges 100 and 102 located at the junctions between the centrally increased diameter portion and the ends of the rod. Flexible washers 104 and 106 suitably secured on the rod 98 and seated on the flanges 100 and 102 cooperate respectively with the shoulders 76 and 78 to control the communications between chambers 58a and 60a and the intermediate chamber 74; and flexible valve disks 108 and 110 also secured to the rod 98 in abutting relation to the washers 100 and 102 cooperate with the valve seat disks 66 and 68 to control the orifices 70 and 72 providing a communication between the large chambers 58 and 60 and the small chambers 58a and 60a.

Inasmuch as the suction of the intake manifold is connected to the chamber 74 and the chambers 58 and 60 are vented to the atmosphere, it is clear that with the valve parts in a position shown in Figure 3, the chamber 58a is connected to the atmosphere, while the chamber 60a is connected with suction. Therefore, the outer face of the washer 104 is exposed to atmospheric pressure while both faces of the washer 106 are exposed to suction. The only portion of the elements 106 and 110 which is exposed to atmosphere is that which covers the opening 72. On the other hand, the whole outer area of 104 and all of 106 is exposed to atmosphere. Thus the differential pressure between atmosphere and suction holds the valve in the position shown until it may be moved therefrom by the action of the solenoid 90. Therefore, it is only necessary that the solenoid 92 be energized for an instant of time to move the valve to the position shown whereupon it will stay as shown and a continuous circuit is not necessary. When the solenoid 90 is energized it moves the valve elements to the left so that then the pressure conditions are reversed and the valve will be held to the left by the differentials in pressure. Therefore, the solenoid 90 also has to be energized only for an instant of time to move the valve and thereafter the valve is held by differentials in pressure.

An electric circuit for energizing the solenoids 90 and 92 includes a source of electric supply such as a storage battery 112 grounded as indicated at 114. The battery has connected thereto in series an ignition switch 116, a conventional make-and-break switch 118 and a conventional make-and-break switch 120. The switch 118 is electrically connected to a conventional switch 122 and is operatively connected by a link 124 to the clutch pedal 16; and the switches 120 and 122 are operatively connected by a rod 126 to the shifting lever 20 of the transmission. The switch 120 is connected to a pair of conventional push button switches 128 (to open door) and 128a (to close door). The switches are easily accessible to the operator of the vehicle and are normally maintained open so as to maintain the circuits normally open. They may be operated when desired to open or close the door. The switch 122 is connected to the coil of the solenoid 90 and the switch 128a is also connected to the solenoid 90. The switch 128 is connected to the solenoid 92.

When the vehicle is at rest with the motor idling the clutch pedal lever 16 is in fully contracted position, the shifting lever 20 is in neutral position; the switch 118 controlled by the foot pedal lever is in open position; the switch 120 controlled by the shifting lever is in closed position; and the switch 122 also controlled by the shifting lever is in open position. Under these circumstances, the operator of the vehicle may open the door 28 by actuating the switch 128 on the dash of the vehicle to close the circuit between the switch 120 and the solenoid 92. The closing of this circuit results in actuation of the solenoid 92 and the valve mechanism controlled thereby.

This actuation of the valve mechanism results in opening the orifice 70 so as to vent that end of the vacuum cylinder 30 connected to the chamber 58 by the pipe line 80 and also to close the orifice 72 and also to close the communication between the chamber 58a and the chamber 74. Thus communication is established between that end of the cylinder 30 connected to the chamber 60a by the pipe line 82 and the manifold 12 of the engine connected by the pipe line 84 to the chamber 74 communicating with the chamber 60a. When the communication between the manifold of the engine and the vacuum chamber 30 is established, the piston 38 of the cylinder is actuated by suction in the manifold and during this actuation pull is transmitted through the rod 40 of the piston to the crank 48 resulting in opening the door 28.

Assuming that the vehicle is at rest with the engine 10 stopped, then inasmuch as the intake manifold is at atmospheric pressure, both sides of the cylinder 30 are at atmospheric pressure and the door may be opened or closed manually. If, however, the operator desires to leave the vehicle with the engine running, he may open or close the door by power by using the key switch 128b as hereinafter described.

Assuming that the vehicle is at rest with the engine 10 stopped, that the clutch is in fully retracted position, and that the shifting lever 20 is in neutral position, the operator, upon entering the vehicle, first closes the ignition switch 116 and thereafter starts the engine in the customary manner. Closing of the ignition switch 116 completes the circuit from the battery 112 through the ignition switch 116 to the switch 120 and through the switch 120 to the switches 128 and 128a on the dash of the vehicle. Accordingly, the operator may now close the door by actuating the switch 128a so as to complete the circuit connecting the switch 128a to the solenoid 90. This results in energizing the solenoid 90 and actuating the valve mechanism controlled thereby and this actuation of the valve mechanism closes the orifice 70, opens the communication between the chamber 58a and the chamber 74, and closes the communication between the chamber 60a and the chamber 74. Thus communication is established between that end of the cylinder 30 connected by the pipe line 80 to the chamber 58 and the manifold 12 connected by the pipe line 84 to the chamber 74. Upon establishing this communication, suction in the manifold actuates the piston 38 and during this actuation of the piston the rod 40 thereof exerts a thrust or push on the crank 48 resulting in closing the door 28.

In the event that the operator does not close the door by actuating the switch 128 on the dash of the vehicle, the door is automatically closed upon actuation of the clutch pedal lever 16 and manipulation of the shifting lever 20 in the usual manner. On depressing the foot pedal lever 16, the switch 118 controlled thereby is closed, and in shifting the lever 20 in any one of the conventional positions, the switch 122 controlled by the shifting lever is closed. This completes the circuit from the battery 112, through the ignition switch 116, the switch 118, and the switch 122 to the solenoid 90, resulting in energizing of the solenoid 90 and actuation of the valve mechanism controlled thereby so as to establish communication between the manifold 12 and the cylinder 30 as hereinabove described.

With the vehicle in motion the shift lever 20 will be moved from the position shown and the switch 120 will be moved to break the electric circuit. Therefore, operation of the push buttons 128 and 128ª will have no effect on opening or closing the door. It is therefore impossible for the door to be opened while the vehicle is in motion.

The key switch 128ᵇ is arranged to be operated from outside of the vehicle and serves as a substitute optionally for either switch 128 or 128ª.

From the foregoing it will be clearly understood that under normal conditions of operation the door 28 of the vehicle is automatically closed immediately upon shifting the gears of the transmission preparatory to placing the vehicle in motion, and is maintained closed while the vehicle is in motion.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is,

1. A motor vehicle having an internal combustion engine and a transmission and clutch associated therewith and each of which is provided with a control member, and which has a body provided with a door, in combination with vacuum operated means actuated by the engine for opening and closing the door and which has an electrical control circuit including switches actuated respectively by the clutch and transmission control members.

2. A motor vehicle having an internal combustion engine and a transmission associated therewith and which is provided with a control member, and which has a body provided with a door, in combination with vacuum operated means actuated by the engine for opening and closing the door and which has an electrical control circuit including a switch actuated by the transmission control member and a key-controlled switch associated therewith.

HENRY BAADE.